United States Patent
Chen et al.

(10) Patent No.: US 9,385,935 B2
(45) Date of Patent: Jul. 5, 2016

(54) TRANSPARENT MESSAGE MODIFICATION FOR DIAGNOSTICS OR TESTING

(71) Applicant: Microsoft Technology Licensing, LLC, Redmond, WA (US)

(72) Inventors: Hongwei Chen, Kirkland, WA (US); Pei Lu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 390 days.

(21) Appl. No.: 13/787,412

(22) Filed: Mar. 6, 2013

(65) Prior Publication Data

US 2014/0258484 A1      Sep. 11, 2014

(51) Int. Cl.
   *G06F 15/173* (2006.01)
   *H04L 12/26* (2006.01)
   *H04L 29/08* (2006.01)
   *H04L 29/06* (2006.01)

(52) U.S. Cl.
   CPC ............ *H04L 43/50* (2013.01); *H04L 43/12* (2013.01); *H04L 67/2814* (2013.01); *H04L 67/327* (2013.01); *H04L 69/22* (2013.01)

(58) Field of Classification Search
   CPC ..... H04L 43/00; H04L 43/10; H04L 67/2814; H04L 67/327; H04L 12/26
   USPC .......................................................... 709/223
   See application file for complete search history.

(56) References Cited

U.S. PATENT DOCUMENTS

| | | | |
|---|---|---|---|
| 6,538,988 B1* | 3/2003 | Natarajan et al. | 370/216 |
| 7,421,478 B1* | 9/2008 | Muchow | 709/209 |
| 7,444,267 B2 | 10/2008 | Hagerott et al. | |
| 7,509,425 B1* | 3/2009 | Rosenberg | H04L 65/1069 709/227 |
| 7,565,451 B2* | 7/2009 | Cabrera | G06F 9/547 709/238 |
| 7,620,851 B1 | 11/2009 | Leavy et al. | |
| 7,898,938 B2* | 3/2011 | Harada | 370/216 |
| 8,069,225 B2* | 11/2011 | McCanne et al. | 709/219 |
| 8,200,752 B2* | 6/2012 | Choudhary et al. | 709/203 |

(Continued)

FOREIGN PATENT DOCUMENTS

EP      1401147 A1      3/2004

OTHER PUBLICATIONS

Ding, et al., "Splitter: A Proxy-based Approach for Post-Migration Testing of Web Applications", In Proceedings of the 5th European Conference on Computer Systems, Apr. 13, 2010, 14 pages.

(Continued)

*Primary Examiner* — Razu A Miah
(74) *Attorney, Agent, or Firm* — Nicholas Chen; Aaron Hoff; Micky Minhas

(57) ABSTRACT

The modification of a network message so that a supplemental action is performed in transit at a designated intermediary node. The modification is performed in a manner that is transparent to the source computing entity that caused the network message to be generated. Upon acquiring the network message, a message modification component modifies the network message so that the network message is routed through an intermediary node, and further so that the intermediary node performs supplemental action(s). For instance, the modification might cause routing components to route the network message to the intermediary node, and the modification might also include instructions that the intermediary node interprets as being an instruction to perform the supplemental action.

18 Claims, 5 Drawing Sheets

Computing System
100

(56) References Cited

U.S. PATENT DOCUMENTS

| | | | |
|---|---|---|---|
| 8,255,544 B2 | 8/2012 | Lam | |
| 2002/0023172 A1* | 2/2002 | Gendron et al. | 709/238 |
| 2002/0059429 A1 | 5/2002 | Carpenter et al. | |
| 2002/0184386 A1* | 12/2002 | Moreau | H04L 67/2819 709/238 |
| 2003/0083994 A1* | 5/2003 | Ramachandran et al. | 705/52 |
| 2003/0137961 A1* | 7/2003 | Tsirtsis | H04L 29/06 370/338 |
| 2003/0169749 A1* | 9/2003 | Huang | H04L 45/00 370/401 |
| 2003/0208572 A1* | 11/2003 | Shah et al. | 709/223 |
| 2004/0078450 A1* | 4/2004 | Chen | H04L 67/327 709/214 |
| 2004/0095944 A1* | 5/2004 | Mitchell | 370/401 |
| 2004/0117339 A1* | 6/2004 | Thubert | H04L 12/24 |
| 2004/0177247 A1* | 9/2004 | Peles | 713/155 |
| 2004/0246957 A1* | 12/2004 | Grimminger | 370/389 |
| 2005/0080912 A1* | 4/2005 | Finn | H04L 12/4691 709/230 |
| 2005/0091024 A1 | 4/2005 | Patiejunas | |
| 2006/0031536 A1* | 2/2006 | Eydelman | H04L 29/06027 709/228 |
| 2006/0161684 A1* | 7/2006 | Michl | H04L 43/18 709/246 |
| 2007/0160042 A1* | 7/2007 | Dollo et al. | 370/389 |
| 2008/0270618 A1* | 10/2008 | Rosenberg | H04L 65/1069 709/228 |
| 2009/0232011 A1* | 9/2009 | Li | H04L 43/50 370/248 |
| 2009/0323522 A1* | 12/2009 | Deguchi | H04L 12/5695 370/228 |
| 2010/0041422 A1* | 2/2010 | Wormald | G06Q 30/02 455/466 |
| 2010/0118711 A1* | 5/2010 | Cankaya | H04L 41/5016 370/248 |
| 2010/0302957 A1* | 12/2010 | Ketheesan et al. | 370/252 |
| 2011/0086628 A1* | 4/2011 | Karuturi | H04Q 3/0029 455/418 |
| 2011/0264810 A1 | 10/2011 | Lam | |
| 2012/0151498 A1* | 6/2012 | Furneaux | G06F 9/546 719/314 |
| 2012/0155389 A1* | 6/2012 | McNamee et al. | 370/328 |
| 2012/0166586 A1* | 6/2012 | Sheffi | H04L 67/2819 709/217 |
| 2012/0317276 A1* | 12/2012 | Muniraju | 709/224 |

OTHER PUBLICATIONS

Menegotto, et al., "A Practical Methodology for Experimental Fault Injection to Test Complex Network-Based Systems", In 10th Latin American Test Workshop, Mar. 2, 2009, 6 pages.

Edwards, et al., "Network Virtualization for Transparent Testing and Experimentation of Distributed Applications", In Proceedings of the IEEE International Conference on Networks, Nov. 16, 2005, 6 pages.

"Using RTSP with Firewalls, Proxies, and Other Intermediary Network Devices", Retrieved on: Feb. 11, 2013, Available at: http://docs.real.com/docs/proxykit/rtspd.pdf.

Farj, et al., "A Fault Injection Method for Testing Dependable Web Service Systems", In Technical Report Series, Computing Science, Newcastle University, No. CS-TR-1263, Jul. 2011, 13 pages.

Deri, et al., "MicroCloud-based Network Traffic Monitoring", Retrieved on: Feb. 19, 2013, Available at: http://fuscof.ntop.org/research/.

Sherry, et al., "Netcalls: End Host Function Calls to Network Traffic Processing Services", In Technical Report, Electrical Engineering and Computer Sciences University of California at Berkeley, Jul. 12, 2012, 16 pages.

Cardellini, et al., "Dynamic Load Balancing on Web-server Systems", In Proceedings of IEEE Internet Computing, vol. 3, Issue 3, May, 1999, 12 pages.

"International Search Report & Written Opinion for PCT Patent Application No. PCT/US2014/019798", Mailed Date: Jul. 3, 2014, Filed Date: Mar. 3, 2014, 9 Pages.

* cited by examiner

TRANSPARENT MESSAGE MODIFICATION FOR DIAGNOSTICS OR TESTING

BACKGROUND

Many software applications rely on cooperative interaction with other computing systems over a network. The Internet Protocol (IP) is a protocol that provides for a mechanism to address different nodes in a network, and also provides a mechanism to fragment larger messages into smaller pieces that can be handled by the various intermediating networks between two communicating network nodes. Network messages that conform to an Internet Protocol are often referred to as "IP packets", which are processed using logic at the IP layer in the protocol stack.

As an IP packet is in transit from the source application to the target application, the IP packet will often transit through various routers, each having their own routing logic at the IP layer in the protocol stack, that allows the router to make decisions about how to best route the IP packet to the intended destination.

The IP protocol also provides for a portion of the packet header to include a selection of a larger number of optional processing to apply to the IP packet. One of these options is a source route option, which allows the source to specify part or all of the route to take.

SUMMARY

In accordance with at least one embodiment described herein, the modification of a network message so that a supplemental action is performed in transit at a designated intermediary node is described. The modification is performed in a manner that is transparent to the source computing entity (such as an application, process, port, address) that caused the network message to be generated. For instance, although the source computing entity issued the instruction that caused the network message to be generated further down the network stack, the source computing entity does not have a view on that lower portion of the stack.

Upon acquiring the network message, a message modification component modifies the network message so that the network message is routed through an intermediary node, and further so that the intermediary node performs a supplemental action. For instance, the modification might cause routing components to route the network message to the intermediary node, and the modification might also include instructions that the intermediary node interprets as being an instruction to perform the supplemental action. Examples of supplemental action including actions that at least facilitate diagnostics of the source computing entity. Further examples include testing actions such as dropping or delaying the network message, or returning an error message related to the network message.

The intermediary node may thus respond to the network message by performing the supplemental action. Furthermore, the intermediary node may modify the network message so as to return the network message to its unmodified state prior to routing the network message further along towards the target. Thus, from the viewpoint of the source computing entity and the target computing system, the fact that there was ever an instruction to perform the supplemental action is abstracted from view.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the modification of a network message is described. The modification causes the network message to be routed to an intermediary node, and is interpreted by the intermediary node as an instruction to perform a supplemental action. The modification is performed in a manner that is transparent to the source computing entity that caused the network message to be generated. Some introductory discussion of a computing system will be described with respect to FIG. 1. Then, the principles of the message modification will be described with respect to FIGS. 2 through 5.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
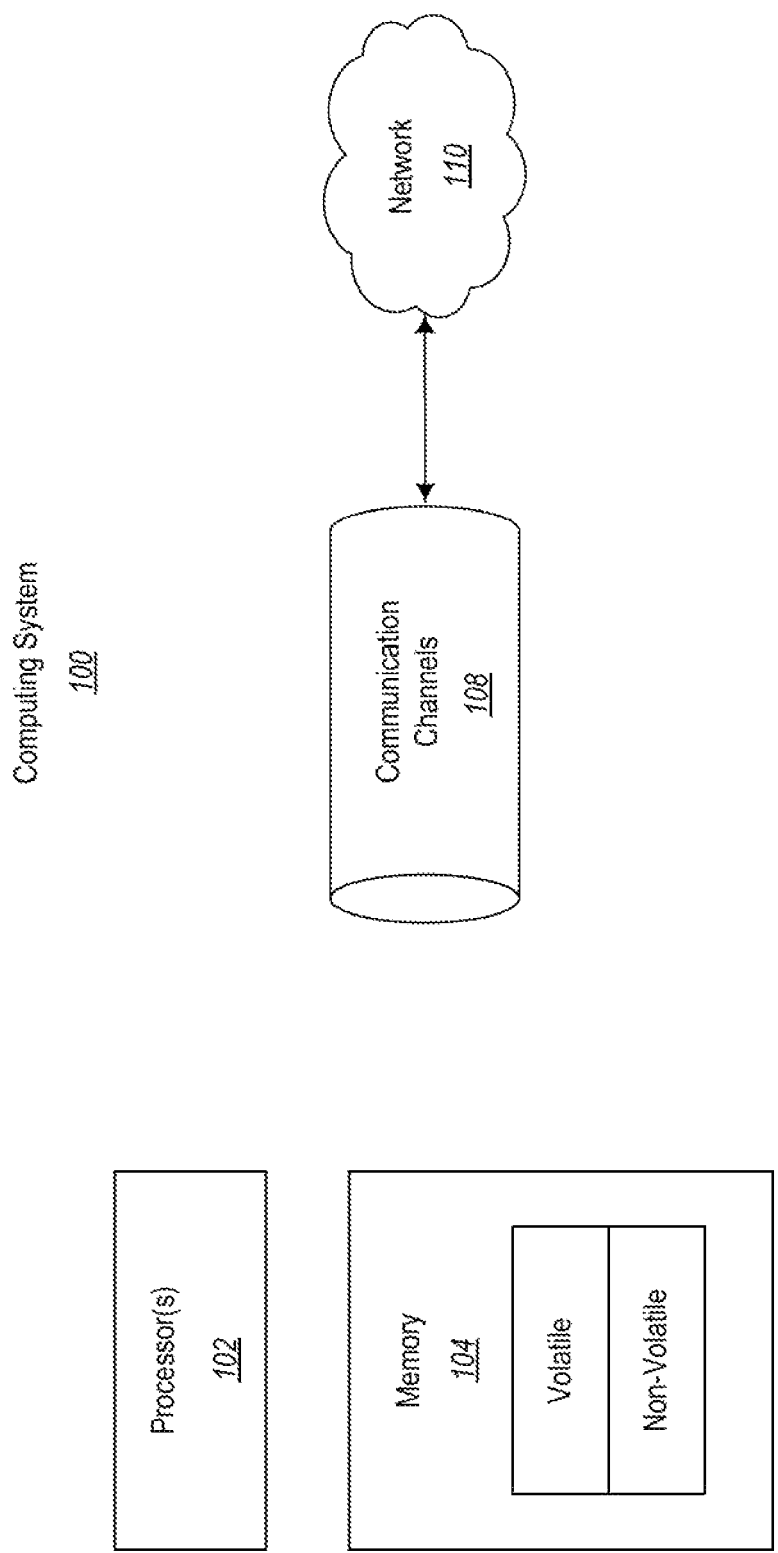
FIG. 1 abstractly illustrates a computing system in which some embodiments described herein may be employed.

As illustrated in FIG. 1, in its most basic configuration, a computing system 100 includes at least one processing unit 102 and computer-readable media 104. The computer-readable media 104 may conceptually be thought of as including physical system memory, which may be volatile, non-volatile, or some combination of the two. The computer-readable media 104 also conceptually includes non-volatile mass storage. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads). Such executable modules may be managed code in the case of being executed in a managed environment in which type safety is enforced, and in which processes are allocated their own distinct memory objects. Such executable modules may also be unmanaged code in the case of executable modules being authored in native code such as C or C++.

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface controller (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
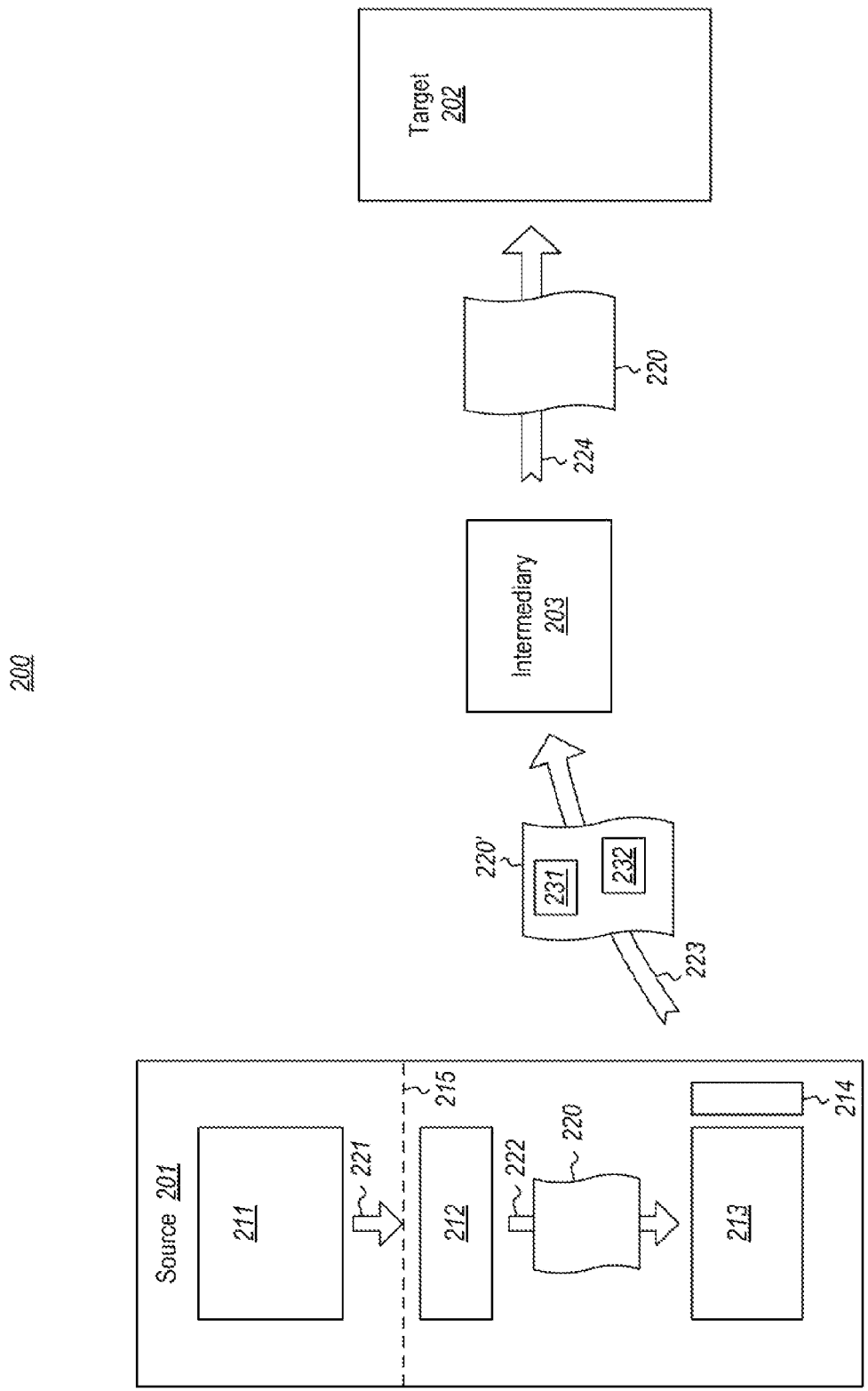
FIG. 2 illustrates a network environment that includes a source computing system includes a source computing entity that causes a network message to be generated for communication to a target computing system.

FIG. 2 illustrates a network environment 200 that includes a source computing system 201 that includes a source computing entity 211 that causes a network message 220 to be generated for communication to a target computing system 202. In a manner that is transparent to the source computing entity 201, the network message 220 is modified 220' so as to be routed through an intermediary node 203. The source computing system 201, the target computing system 202 and the intermediary node 203 each represent examples of a computing system that is described above with respect to FIG. 1. Methods described as being performed by these computing systems may be performed by, for example, one or more processors (such as processor(s) 102) of the computing system (e.g., computing system 100) executing computer-executable instructions that are embodied on a computing-readable media (such as a computing-readable storage media) that may form part or all of a computing program product.

The source computing entity 211 causes the network message 220 to be generated by, for example, issuing a request 221 that is interpretable by components 212 to cause such components 212 to generate the network message 220. As an example, the source computing entity 211 might be an application, a process, a port, an address, or any other computing entity.

Although the source computing entity 211 causes the network message 220 to be generated via request 221, the actual generation of the network message 220 is performed by logic that is abstracted away from the view of the source computing entity 211. Such abstraction is symbolized by the dashed line 215. While the network message may be any kind of network message, in one embodiment, the network message 220 is an Internet Protocol (IP) packet.

The network message 220 is provided to a message modification component 213 as represented by arrow 222. The message modification component 213 performs modifications to the network message 220. For instance, the modifications that are to be performed may be a function of the identity of the source computing entity 211. For instance, the message modification component 213 may have a register entry in which there are one or more modifications associated with the source computing entity 211.

Figure 3:
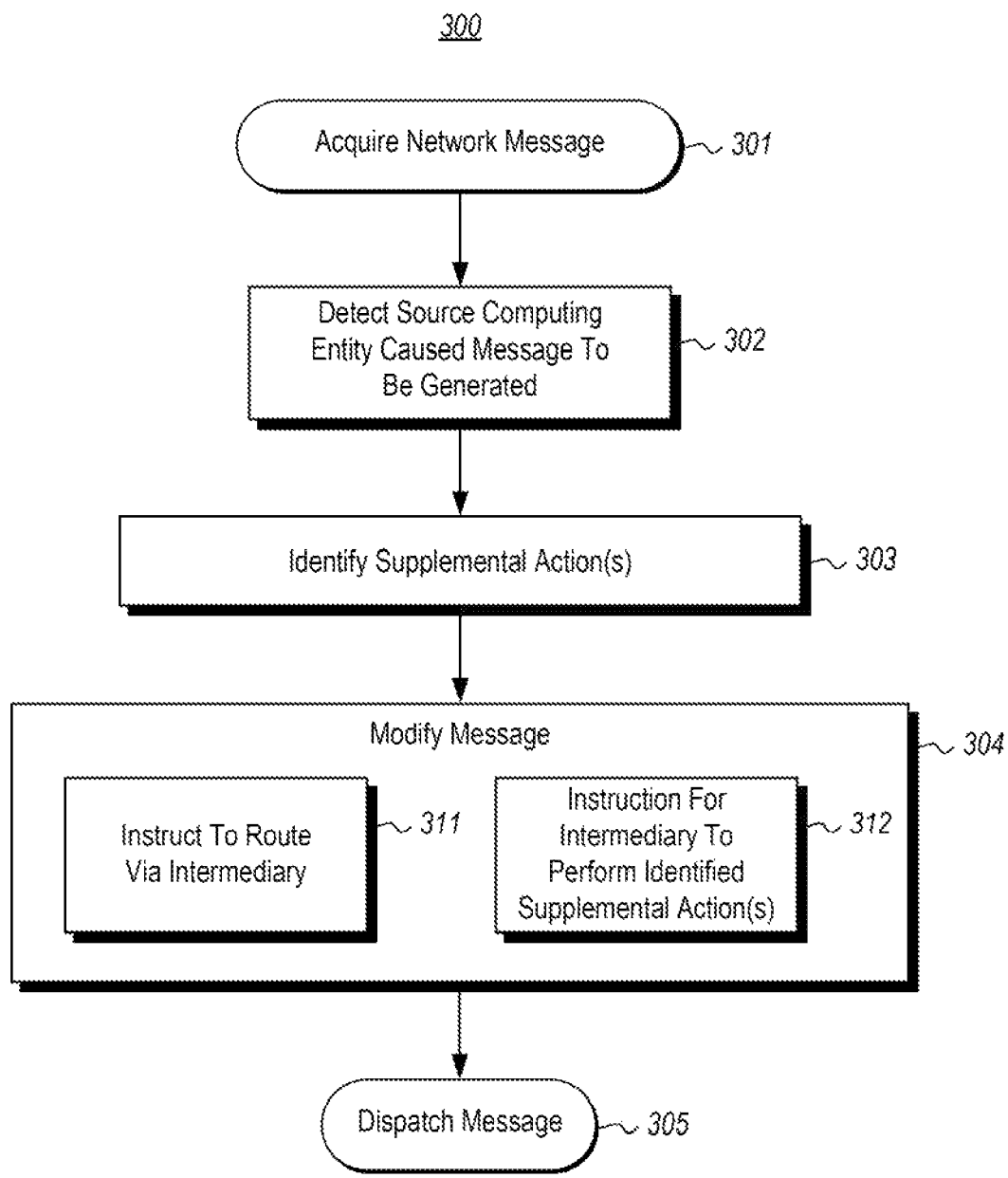
FIG. 3 illustrates a flowchart of a method for a message modification component facilitating supplemental action being taken on a network message in a manner that is transparent to a source computing entity that caused the network message to be generated.

FIG. 3 illustrates a flowchart of a method 300 for a modification component facilitating supplemental action being taken on a network message in a manner that is transparent to a source computing entity that caused the network message to be generated. The method 300 is initiated upon acquiring a network message that was caused to be generated by a source computing entity (initiating event 301). As the method 300 may be performed by the message modification component 213 of FIG. 2, the method 300 of FIG. 3 will now be described with frequent reference to FIG. 2.

The message modification component detects that the network message was caused to be generated by a particular computing identity (act 302), and then identifies one or more supplemental actions that are to be performed on network messages coming from that particular computing entity (act 303). The message modification component may be, for example, a firewall that has access to network messages, and is capable of modifying the network messages in a manner that is transparent to the source computing entity.

The message modification component then modifies the network message (act 304) so that the network message is routed through an intermediary node, and such that the intermediary node performs a supplemental action on the network message. For instance, the message modification component might modify the network message to include an instruction to route the network message via the intermediary node (act 311). For instance, in FIG. 2, the modified message 220' includes instruction 231 that cause the network message 220' to be routed to the intermediary node 203 as represented by the arrow 223. The message modification component may also modify the message to include an instruction that is interpretable by the intermediary node as an instruction for the intermediary node to perform the supplemental action (act 312). This instruction is represented in FIG. 2, by the instruction 232 being added to the network message 220 to form the modified message 220'.

If the message modification component 213 were a firewall component, the firewall may perform other firewall functions on the modified network message 220' prior to dispatching the modified network message to the intermediary node (act 305). For instance, referring to FIG. 2, the message modification component 213 uses dispatching component 214 to dispatch the network message to the intermediary node 203.

The supplemental action to be performed by the intermediary is beyond what a routing node would have performed in response to receiving the network message 220 in unmodified form without the instruction to perform the supplemental action. Several examples of such supplemental actions will now be described along with a description of how an IP packet could be modified so as to include an instruction to route via the intermediary node (instruction 231) and an instruction to perform the supplemental action (instruction 232). In each example, the modification of the IP packet might occur by adding an IP options portion of the header portion. In accordance with the IP protocol, this would also include modifying the length field of the IP header portion to account for the additional header length caused by the insertion of the IP options portion.

In one embodiment, the supplemental action might be a diagnostics action that causes the intermediary node to use the network message to at least facilitate diagnostics of the source application. For instance, the intermediary node might gather statistics regarding the network message, and perhaps also inspect content of the network message. The thereby gathered information (perhaps in combination with other information gathered from other network messages from the source computing entity) might be used to ascertain performance of the source computing entity, or otherwise diagnose a current or emerging problem within the source computing entity. The intermediary node 203 may itself perform this diagnostics, or the intermediary node 203 might report the gathered information to another computing system for performing diagnostics based on the information gathered at the intermediary node 203.

The instruction to route through the intermediary node and to perform the diagnostics action might be performed by specifying the loose source route option in an IP option field added to the IP packet. For instance, the first octet of the options field would include the following: a "1" in the first bit (i.e., the copy bit) indicating that the option is to apply to all related packets corresponding to a single message; followed by the class bits (2 bits) being a 0, and then followed by the 5 value bits specifying a 3, which identifies the loose source route option. Following this first octet would be a length octet specifying a length of the IP option fields consistent with the IP protocol, a pointer octet specifying a pointer which initially points to the following set of 4 octets which would specify the IP address of the intermediary node. Additional data could be added, which could be interpreted by the intermediary node as an instruction to perform the diagnostic action.

The supplemental action might also be to perform a testing action that causes the intermediary node to at least facilitate testing of the source computing entity 211. For instance, suppose that the source computing entity 211 were actually a system under test, and that the target computing system 220 was an external dependency that the source computing entity 211 is anticipated to rely upon after the source computing entity 211 is actually deployed. The testing action might allow for actually real world scenarios to be encountered to determine how the source computing entity 211 responds to such real world scenarios. For instance, the testing action might include dropping the network message, delaying the network message, or returning an error message, which would be an Internet Control Message Protocol (ICMP) in the case of the network message being an IP packet. Such would simulate actual possible conditions that might be encountered by the source computing entity 211.

In the case of an IP packet, this might again be performed by adding an IP options portion to the header of the IP packet. The first octet includes a first bit that specifies a "1" for the copy bit, meaning that the IP options portion is included in all packets that are fragments of the same message. The next two bits represents the class, and could be a previously unused class (such as 3), which is reserved for future use in the original IP protocol. The intermediary node could be programmed to recognize a class of 3 to mean that a testing action of some type is to be performed. For instance, the final five bits of the first octet in the IP options portion might specify a value corresponding to a particular testing action to be performed. For instance, a 1 might be for a delay to be added into the message delivery. A 2 in these 5 bits might specify that an error message is to be returned. A 3 in these 5 bits might specify that the IP packet is to be dropped.

Following a particular schema, the exact structure of which is not important to the broader principles described herein, supplemental data regarding the selected testing action may also be provided. For instance, in the case of a delay action, the amount of latency might be specified or might be derived from transmission speed. In the case of an error message being returned, a type of error message may be specified. Furthermore, the schema of the remainder of the IP options could be structured to allow for additional testing actions to be specified. For instance, the IP packet could be both delayed a certain amount, and an error message is returned. The schema might also allow for more complex testing workflows such as conditionally performing a testing action.

Figure 4:
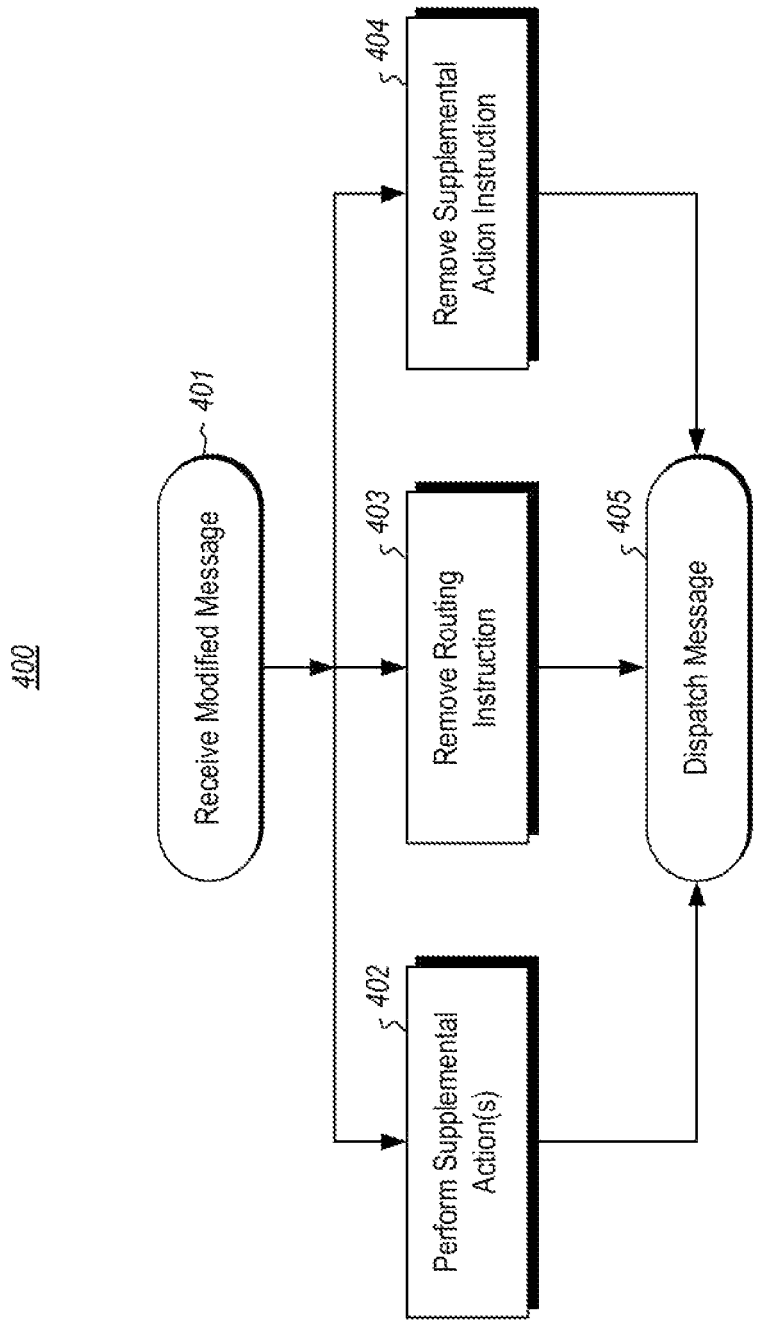
FIG. 4 illustrates a flowchart of a method for an intermediary node intermediating a network message received from a source to a target.

Returning to FIG. 2, once the intermediary node 203 receives the modified network message 220', the intermediary node 203 takes action by performing the supplemental action(s) to thereby facilitate diagnostics and/or testing of the source computing entity 210 in an actual environment in which there is an external dependency in the form of target computing system 220. FIG. 4 illustrates a flowchart of a method 400 for an intermediary node (such as intermediary node 203) intermediating a network message received from a source (such as source 201) to a target (such as target 202).

The method 400 is initiated upon receiving the modified network message in transit from a source to a target (initiating act 401). For instance, in FIG. 2, the intermediary node 202 receives the modified network message 220' that includes the routing instruction 231 as well as the supplemental action instruction 232. In response to the supplemental action instruction 232, the intermediary code 202 performs the instructed supplemental action (act 402), such as the described diagnostic action and/or the described testing action.

In addition, the intermediary node 202 modifies the network message to remove the instruction to perform the supplemental action on the network message (act 403), and removes the instruction to route the network message through the intermediary computing system (act 404). For instance, the intermediary node 203 might return the network message to its original form 220 as it existed prior to being modified to include the instructions 231 and 232. For instance in the case of the IP packet, the IP options portion may be removed, with the length field of the IP header portion being reverted to its original value, reflecting the absence of the IP options portion. The network message 220 is then dispatched to the target computing system 202 (act 405) as represented by the arrow 224 in FIG. 2. Thus, the network message 220 dispatched by the intermediary node 203 may appear identical to the network message 220 as generated by the components 212. Thus, neither the source computing entity 211 nor the target computing system 202 can be aware that the network message was routed through the intermediary node 203, or that the supplemental action(s) were taken.

Note that the principles described herein can be applied when in a request/response paradigm. For instance, in FIG. 2, the source computing system 201 might transmit a request to the target computing system 202, in which case, the network message is a request or a fragment thereof. Thus, the network message 220 could be at least part of a request in a request/reply message sequence. However, the same principles can apply to the reverse path as well. In that case, the network message 220 would be at least part of a reply in a request/reply message sequence.

Figure 5:
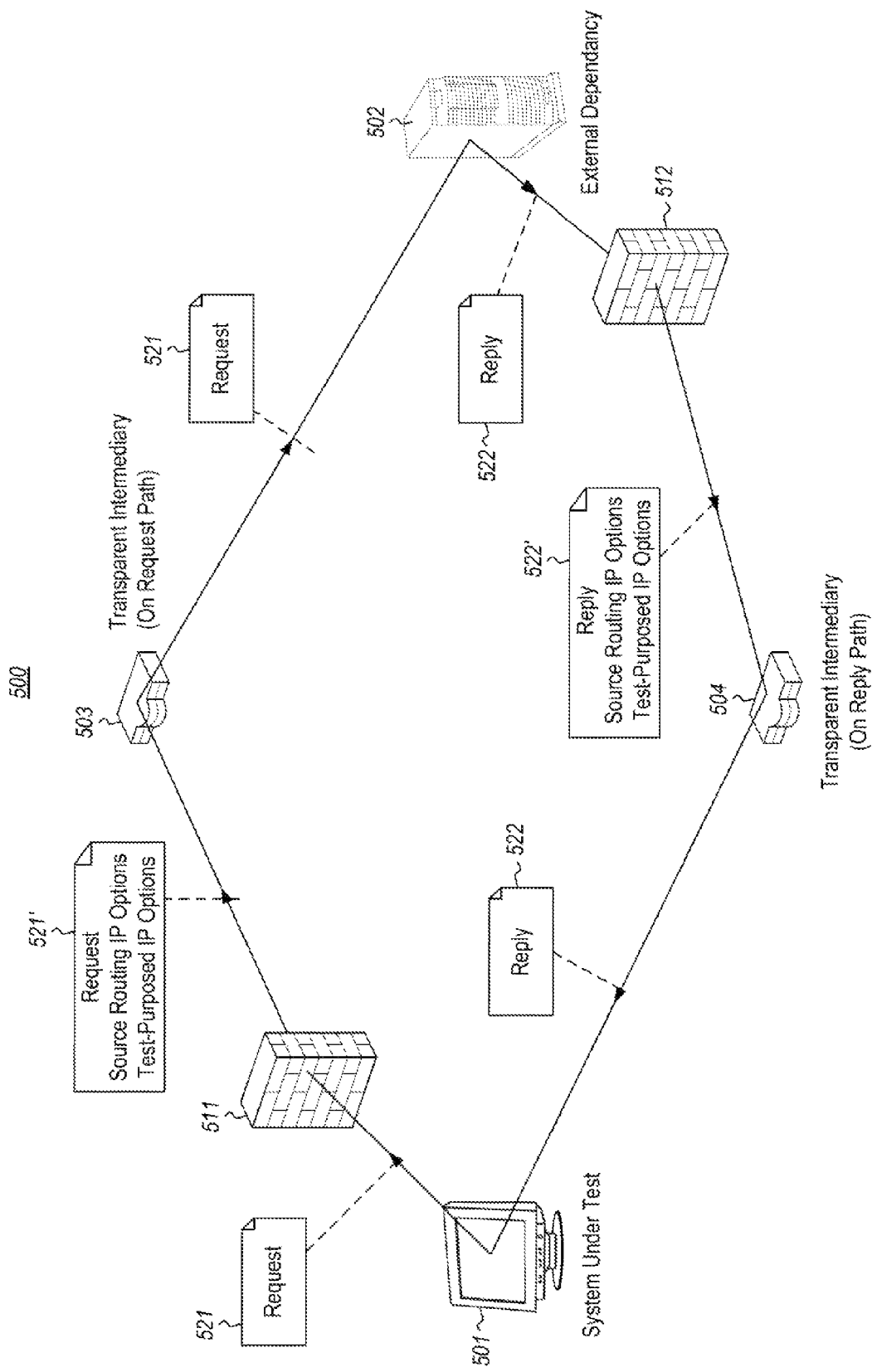
FIG. 5 illustrates a more specific embodiment in which the principles described with respect to FIGS. 2 through 4 are applied in both the request path and the reply path.

FIG. 5 illustrates a more specific embodiment in which the principles described with respect to FIGS. 2 through 4 are applied in both the request path and the reply path. In the request direction, the system under test 501 (or the system to which diagnostics is being applied) represents an example of the source computing system 201 of FIG. 2, and the external dependency computing system 502 represents an example of the target computing system 202 of FIG. 2. In this request direction, the firewall 511 represented an example of the message modification component 213 of FIG. 2. Furthermore, request 521 and modified request 521' represent examples of the message 220 and the modified message 220' of FIG. 2. The intermediary node 503 represents an example of the intermediary node 203 of FIG. 2.

In the response direction, the external dependency computing system 502 represents an example of the source computing system 201 of FIG. 2, and the system under test 501 (or the system to which diagnostics is being applied) represents an example of the target computing system 202 of FIG. 2. In this response direction, the firewall 512 represented an example of the message modification component 213 of FIG. 2. Furthermore, reply 522 and modified reply 522' represent examples of the message 220 and the modified message 220' of FIG. 2. The intermediary node 504 represents an example of the intermediary node 203 of FIG. 2.

Accordingly, the principles described herein provide for a mechanism to transparently perform supplemental actions on a network message without the source computing entity that caused the network message or the target computing system being aware that the supplemental action was performed. Such can be especially useful in a diagnostics environment after the source computing entity has been deployed, or in a testing environment in which the source computing entity is under development and has an external dependency.

The principles described herein may be deployed in a cloud computing environment. For instance, referring to FIG. 2, each of the source computing system 201 and the target computing system 202 may itself be a cloud computing environment, or perhaps the entire environment 200 might be a cloud computing environment.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a message modification component facilitating supplemental action being taken on a network message in a manner that is transparent to a source computing entity that caused the network message to be generated, the method comprising:
   the message modification component acquiring a network message from a source that includes a source computing entity, wherein the message modification component acquiring the network message is unknown to a source computing entity that caused the network message to be generated and sent to a target;
   the message modification component registering that at least some network messages that are caused to be generated by the source computing entity are to be modified; and
   the message modification component detecting that the network message was caused to be generated by the source computing entity; and
   the message modification component modifying the network message so that the network message is routed through an intermediary node and includes an instruction which identifies a supplemental action which is to be performed by the intermediary node, such that, when the intermediary node receives the network message, the intermediary node performs the supplemental action on the network message, wherein the supplemental action is not an action that a routing node would have performed on the network message without the modification.

2. The method in accordance with claim 1, wherein the message modification component comprises a firewall component.

3. The method in accordance with claim 2, further comprising:
   an act of the firewall performing one or more firewall functions on the network message after modifying the network message.

4. The method in accordance with claim 1, wherein the network message is an Internet Protocol packet.

5. The method in accordance with claim 4, wherein modifying the message comprises an act of inserting an IP options portion of an IP header.

6. The method in accordance with claim 5, wherein the IP options portion specifies a source route action.

7. The method in accordance with claim 5, wherein the IP options portion specifies a test action.

8. The method in accordance with claim 1, wherein the supplemental action comprises a diagnostics action that cause the intermediary node to using the network message to at least facilitate diagnostics of the source computing entity.

9. The method in accordance with claim 1, wherein the supplemental action comprises a testing action that causes the intermediary node to at least facilitate testing of the source computing entity.

10. The method in accordance with claim 9, wherein the testing action comprises an act of dropping the network message.

11. The method in accordance with claim 9, wherein the testing action comprises an act of delaying the network message.

12. The method in accordance with claim 9, wherein the testing action comprises an act of returning an error message to the source.

13. The method in accordance with claim 1, wherein the network message is at least part of a request in a request/reply message sequence.

14. The method in accordance with claim 1, wherein the network message is at least part of a reply in a request/reply message sequence.

15. A computer program product comprising one or more computer-readable storage devices having stored thereon computer-executable instructions that are structured such that, when executed by one or more processors of an intermediary computing system, cause the intermediary computing system to perform a method of intermediating a network message received from a source and targeted for a destination, the method comprising:
   receiving a network message in transit from a source to a target, the network message having been modified from an original form generated by the source to include an instruction to route the network message through the intermediary computing system and an instruction for the intermediary computing system to perform a supplemental action;
   in response to the instruction for the intermediary computing system to perform the supplemental action, performing the supplemental action; and
   modifying the modified network message to remove the instruction to perform the supplemental action on the network message and to remove the instruction to route the network message through the intermediary computing system, wherein modifying the network message comprises returning the network message to a state in which the network message existed prior to being modified to include the instruction to route the network message through the intermediary computing system and the instruction for the intermediary computing system to perform the supplemental action.

16. The computer program product in accordance with claim 15, wherein the supplemental action comprises a plurality of actions.

17. The computer program product in accordance with claim 15, wherein the supplemental action comprises at least one of a diagnostics action that at least facilities diagnosis of the source computing entity running at the source, or a testing action that at least facilitates testing by performing at least one of dropping the network message, returning an error, and delaying the network message.

18. A system comprising:
   one or more computer processors;
   system memory; and
   a message modification component executable upon the one or more computer processors which is configured to:
   acquire a network message that was caused to be generated by a source computing entity, wherein the message modification component acquiring the network message is unknown to the source computing entity that caused the network message to be generated and sent to a target;
   register that at least some network messages that are caused to be generated by the source computing entity are to be modified; and
   detect that the network message was caused to be generated by the source computing entity; and modify the network message so that the network message is routed through an intermediary node and includes an instruction which identifies a supplemental action which is to be performed by the intermediary node, such that, when the intermediary node receives the network message, the intermediary node performs the supplemental action on the network message, wherein the supplemental action is not an action that a routing node would have performed on the network message without the modification.

* * * * *